(12) United States Patent
Lambert et al.

(10) Patent No.: US 8,995,670 B2
(45) Date of Patent: Mar. 31, 2015

(54) SYSTEMS AND METHODS FOR LOCAL AND REMOTE RECORDING, MONITORING, CONTROL AND/OR ANALYSIS OF SOUNDS GENERATED IN INFORMATION HANDLING SYSTEM ENVIRONMENTS

(75) Inventors: Timothy M. Lambert, Austin, TX (US); Johan Rahardjo, Austin, TX (US)

(73) Assignee: Dell Products L.P., Round Rock, TX (US)

(*) Notice: Subject to any disclaimer, the term of this patent is extended or adjusted under 35 U.S.C. 154(b) by 979 days.

(21) Appl. No.: 13/097,906

(22) Filed: Apr. 29, 2011

(65) Prior Publication Data

US 2012/0275610 A1 Nov. 1, 2012

(51) Int. Cl.
*H04R 29/00* (2006.01)
*G10K 11/16* (2006.01)
*G10L 25/48* (2013.01)
*G10L 21/0208* (2013.01)
*G01H 3/00* (2006.01)

(52) U.S. Cl.
CPC .......... *G10K 11/16* (2013.01); *H04R 2227/001* (2013.01); *H04R 2410/01* (2013.01); *G10L 21/0208* (2013.01); *G10L 25/48* (2013.01); *G01H 3/00* (2013.01)
USPC .................................. 381/56; 381/57; 381/58

(58) Field of Classification Search
CPC .. H04R 29/00; H04R 29/2227; H04R 29/001; H04R 2410/01; H04R 3/005; H04R 29/008; H04R 1/1083; G10K 11/175; G10K 2210/11; G10L 25/48; G10L 21/0208
USPC .................. 381/56, 57, 58, 94.5, 95, 92, 122; 700/94; 367/13, 901; 704/226, 233
See application file for complete search history.

(56) References Cited

U.S. PATENT DOCUMENTS

| | | | |
|---|---|---|---|
| 5,131,047 A * | 7/1992 | Hashimoto et al. | ........ 381/71.11 |
| 6,760,324 B1 | 7/2004 | Scott et al. | |
| 6,801,613 B1 | 10/2004 | Hamilton | |
| 6,829,348 B1 | 12/2004 | Schroeder et al. | |
| 7,286,051 B2 * | 10/2007 | Lambert | ...................... 340/531 |
| 2001/0040892 A1 | 11/2001 | Spencer | |
| 2002/0064259 A1 | 5/2002 | Tsai | |
| 2002/0069112 A1 | 6/2002 | Abdelhadi et al. | |
| 2003/0048288 A1 | 3/2003 | Drif et al. | |
| 2004/0015559 A1 | 1/2004 | Goldstein | |
| 2004/0044585 A1 | 3/2004 | Franco | |
| 2004/0128496 A1 | 7/2004 | Vrhel, Jr. et al. | |
| 2004/0139156 A1 | 7/2004 | Matthews et al. | |
| 2006/0190532 A1 | 8/2006 | Chadalavada | |
| 2006/0200550 A1 | 9/2006 | Nelson et al. | |
| 2006/0212143 A1 | 9/2006 | Nguyen et al. | |
| 2006/0265656 A1 | 11/2006 | Lambert et al. | |

* cited by examiner

*Primary Examiner* — Paul S Kim
(74) *Attorney, Agent, or Firm* — Egan, Peterman, & Enders, LLP.

(57) ABSTRACT

Systems and methods are disclosed that may be implemented to locally and remotely record, control, monitor and analyze sounds generated in an information handling system environment, e.g., such as in a server environment. Among other things, remote monitoring and observation of sound in a data center environment may be implemented to assist administrators with data center management and forensics analysis related to physical chassis events (e.g., such as chassis access and/or chassis intrusion), as well as providing live streaming, and local technician recorded sound bite capabilities. A sound policy may also be implemented involving server sound optimizations that works in conjunction with system thermal and power algorithms.

28 Claims, 3 Drawing Sheets

SYSTEMS AND METHODS FOR LOCAL AND REMOTE RECORDING, MONITORING, CONTROL AND/OR ANALYSIS OF SOUNDS GENERATED IN INFORMATION HANDLING SYSTEM ENVIRONMENTS

FIELD OF THE INVENTION

This invention relates generally to information handling systems and, more particularly, to local and remote recording, monitoring, control and/or analysis of sounds generated in information handling system environments.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Servers are a type of information handling system. Although the level of noise generated by servers has generally been reduced over the years, noise pollution remains a big problem in many server environments, especially during certain server operations such as during maintenance modes. The level and severity of server noise also varies between different types of servers. For example, 1U server fans are significantly louder than comparable 2U systems, due to increased rotor count and speeds. System workload, ambient temperature and power/performance policies affect fan speeds. Existing server operational policies include power versus performance optimizations utilizing common control methods such as power capping and CPU, memory and I/O throttling. System thermal control algorithms perform in parallel to enforce the required system cooling.

Recent improvements have been made in remote interface technology to allow server administrators to monitor server performance, including virtual LCDs, virtual LEDs, virtual keyboard-video-mouse (KVM), as well as web GUI improvements that include interactive graphics showing the front and rear physical look of the server system, current inventory/configuration and health status. For example, a server management web GUI has been configured to display graphs of time versus power consumption, efficiency, power to cool, subsystem power for I/O subsystem and power for storage subsystem. Remote administrators have also been provided with the capability of remotely setting power and performance characteristics, such as choosing a performance policy that maximizes system performance level (e.g., using highest system bandwidth, highest system processing frequency, etc.) or choosing power policy that maximizes system performance level without exceeding a given power consumption wattage threshold.

Locally, it is common for administrators in high performance computing and communication (HPCC) environments to gauge if batch jobs are in process based on the noise levels of server internal fans. Servers have also been provided with LCD displays and menus that allow for local configuration of parameters such as network settings and for locally observing parameters such as ambient temperature.

SUMMARY OF THE INVENTION

Disclosed herein are systems and methods that may be implemented to locally and remotely record, control, monitor and analyze sounds generated in an information handling system environment, e.g., such as in a server environment. In this regard, although certain embodiments are described herein in relation to server and rack mounted server implementations, it will be understood that one or more the features of the disclosed systems and methods may be implemented with a variety of other types of information handling systems, e.g., such as desk top computers, notebook computers, etc.

In one embodiment, the disclosed systems and methods may be advantageously implemented to improve server administrator remote presence in relation to functions such as embedded server management sound monitoring, event logging/capture and alerting, sound bite recording and predictive failure in server products. For example, remote monitoring and observation of sound in a data center environment may be implemented to assist administrators with data center management and forensics analysis related to physical chassis events (e.g., such as chassis access and/or chassis intrusion), as well as providing live streaming, and technician recorded sound bite capabilities. The disclosed systems and methods may also be used to implement a sound policy and/or interactive control capability to reduce system-generated noise in a safe, full featured way. In another example, local user control may be provided and remote operational polices involving server sound optimizations may be implemented that work in conjunction with system thermal and power algorithms.

The disclosed systems and methods may be advantageously implemented to remotely monitor actual sound levels rather than relying on remote reading of fan RPM which may be not be indicative of the sound near the system. In this regard, sounds produced internally are mostly from fan or hard drive effects and sound observed externally from the front and/or behind a rack server can be from many sources. In the case of internally produced sound, the disclosed systems and methods may be implemented in one embodiment to provide a minimal sound mode feature to be used primarily in maintenance scenarios, i.e., to selectively throttle the system to minimize generated sound or to hit intermediate sound targets using a settable sound capping policy. In this regard, an information handling system, such as a server, may be kept booted and running at reduced sound levels while a user, technician, or administrator is physically working around the given server.

In addition to allowing live observation of internally generated sound level within each server, such capabilities may be advantageously employed to facilitate analysis and control tasks such as system and subsystem power monitoring and power capping. Planning and diagnostic tasks may also be implemented using the disclosed systems and methods, e.g., for data center planning, for quickly inferring the operational load and/or associated ambient temperature changes of a server, or to predict potential failure such as a screeching hard disk drive or a fan. Moreover, one or more control features may also be advantageously enabled using the disclosed systems and methods. For example, a local authorized user may be enabled to intentionally reduce a server's generated volume momentarily or for extended periods. Sound control may be implemented, for example, when a user is physically near an information handling system such as a server during development, customer configuration or deployment and maintenance cycles. It is typically accepted that there may be performance degradation during such maintenance modes. Thus, in one embodiment, the disclosed systems and methods may be configured to provide the ability to locally or remotely enable an active noise control policy for a fully operational server, e.g., by controlling the operating server to maintain a minimized or specific sound production target with selective timeouts, and/or implementing various levels or degrees of server information processing operation performance tradeoffs with other active operational policies.

In one embodiment, a system-on-a-chip, (e.g., such may be used as an embedded server management controller), may be implemented to provide for improved aspects of remote presence in systems management applications by way of the increased computing power, RAM/ROM speed and sizes and wide array of available integrated peripherals. The explicit control, capture, redirection and intelligent use of internally and externally observed sound in a server platform may thus be utilized to provide improved server management features. For example, a service processor subsystem (e.g., provided as part of a management subsystem including a baseboard management controller "BMC") may be configured with platform logic to utilize established CPU, memory and I/O throttling methods (e.g., fixed throttling control to minimize I/O, or variable control to specifically tune I/O) in conjunction with active thermal algorithm and enforcement of other power policies such as power capping. Such a service processor subsystem may be implemented in one exemplary embodiment to include an embedded service management processor and an audio peripheral (e.g., as components of a remote access card (RAC)) that are coupled to one or more microphones selectively placed within a server chassis (e.g., 1U or 2U server box, etc.), and that are sampled to provide status and feedback inputs into a sound and monitoring control algorithm executing on the service processor.

The disclosed systems and methods may be implemented in another exemplary embodiment to monitor sounds external to a given server, and to provide an event log with optional alerts and recorded sound bites related to occurrence of a sound-producing event. In this regard, external server sound/s may be very helpful in forensic investigation of events such as during events involving equipment failure or fires, equipment tampering or theft, etc. External sounds occurring around the chassis of a given server during occurrence of such sound-producing events may be recorded by external and/or internal microphones of a server and later retrieved for analysis. When so implemented, recording of external sounds (e.g., as stored sound bites) may be started or triggered in one exemplary embodiment upon detection of external sound levels that exceed a given sound level threshold (e.g., 110 dB) and/or upon detection of specific types of external noises (e.g., such as voices, crashes, smoke or security alarms, glass breaking, air conditioning noises, etc.). A processing device of the server (e.g., such as a BMC) may be configured to detect particular types of noise, e.g., based on sound pattern or waveforms (e.g., waveform matching), sound frequency, combinations thereof, etc.

Sound bite recording may also be triggered by, for example, upon detection of various system-specific physical chassis events, e.g., such as chassis intrusion, system physical configuration changes (e.g., including system inventory changes such as a cable removal, external hard disk drive removal, redundant power supply removal, or physical actions such as system button presses), system health changes, etc. Such sound bite recordings may be stored for later retrieval across a network by a remote user. Where applicable, sensors may be provided to detect system-specific physical chassis events such as chassis intrusion. It is also possible that sound recording may be remotely triggered when it is desirable to monitor the sound environment around a given server or servers, e.g., to listen for clues as to issues with an adjacent server when that adjacent server is not remotely accessible such as due to an AC power loss or other failure of the adjacent server.

In another exemplary embodiment, local sound bite recording may be enabled (e.g., by a technician, user, etc.) to allow a technician or other personnel to selectively and locally initiate recording of a sound bite that may include, for example, a voice message for later remote retrieval or local retrieval (e.g., from attached audio speaker or headphone jack). For example, once a service technician diagnoses or resolves a server issue, the technician may locally initiate a sound bite recording (e.g., using a front LCD display device/control panel on the server) to record a message that a BMC or other management subsystem component may time stamp and store locally on the server. Additionally or alternatively, such a recorded sound bite message may be transmitted remotely (e.g., compressed and emailed) to a remote administrator present at another geographical location, building, or in another room of the same building. In this regard, it may be helpful to maintain such a recorded voice mail about server condition diagnosis resident on the server itself. Examples of possible local recording control options that may be offered (e.g., on a LCD display device/control panel of an individual server) to a technician or other local personnel may include commands such as record, re-record, send last message to admin, delete last message, etc.

In one respect, disclosed herein is an information handling system, including: a chassis; one or more processing devices disposed within the chassis and configured to process information; at least one noise source within the chassis; at least one microphone positioned to capture sound produced by the noise source within the chassis; and one or more processing devices disposed within the chassis and configured to determine and provide non-audio sound characteristic information of the noise source based on sound signals received from the microphone.

In another respect, disclosed herein is an information handling system, including: a chassis; one or more processing devices disposed within the chassis and configured to process information; at least one internal or external microphone positioned to capture sound produced inside or outside the chassis; and one or more processing devices disposed within the chassis and configured to at least one of: detect occurrence of a specific type of internal or external sound-producing event from sound signals provided by an internal or external microphone, and to take one or more actions upon detection of the occurrence of the specific type of internal or external sound event, or detect occurrence of a physical chassis event, and to capture sounds produced inside or outside the chassis during the physical chassis event upon detection of the occurrence of the physical chassis event for later remote retrieval across a network by a remote user, or a combination thereof.

In another respect, disclosed herein is an information handling system, including: a chassis; at least one microphone positioned to monitor sounds outside the chassis; local data storage; one or more processing devices disposed within the chassis and configured to process information; and one or more processing devices disposed within the chassis and configured to receive sound signals from the microphone and to store the sound signals as sound data on the local data storage, the one or more processing devices being further configured to store in local storage coupled to the audio controller a recorded sound bite from the microphone in response to a local user command, the recorded sound bite including a voice message from the user for later remote retrieval across a network by a remote user.

In another respect, disclosed herein is a method of operating an information handling system, including: processing information using one or more processing devices disposed within a chassis of an information handling system; capturing sound produced by at least one noise source disposed within the chassis of the information handling system; and using one or more processing devices disposed within the information handling system to determine and provide non-audio sound characteristic information of the noise source based on the captured sound produced by the noise source.

In another respect, disclosed herein is a method of operating an information handling system, including: processing information using one or more processing devices disposed within a chassis of an information handling system; capturing sound produced inside or outside the chassis of the information handling system; and using one or more processing devices disposed within the information handling system to at least one of: detect occurrence of a particular type of an internal or external sound-producing event from a captured sound produced inside or outside the chassis of the information handling system, and to take one or more actions upon detection of the occurrence of the particular type of internal or external sound event, or detect occurrence of a physical chassis event, and to capture sounds produced inside or outside the chassis during the physical chassis event upon detection of the occurrence of the physical chassis event for later remote retrieval across a network by a remote user, or a combination thereof.

In another respect, disclosed herein is a method of operating an information handling system, including: processing information using one or more processing devices disposed within a chassis of an information handling system; capturing sound produced outside the chassis of the information handling system; and using one or more processing devices disposed within the information handling system to store in local storage coupled to the audio controller a recorded sound bite produced outside the chassis of the information handling system in response to a local user command, the recorded sound bite including a voice message from the user for later remote retrieval across a network by a remote user.

DESCRIPTION OF ILLUSTRATIVE EMBODIMENTS

Figure 1:
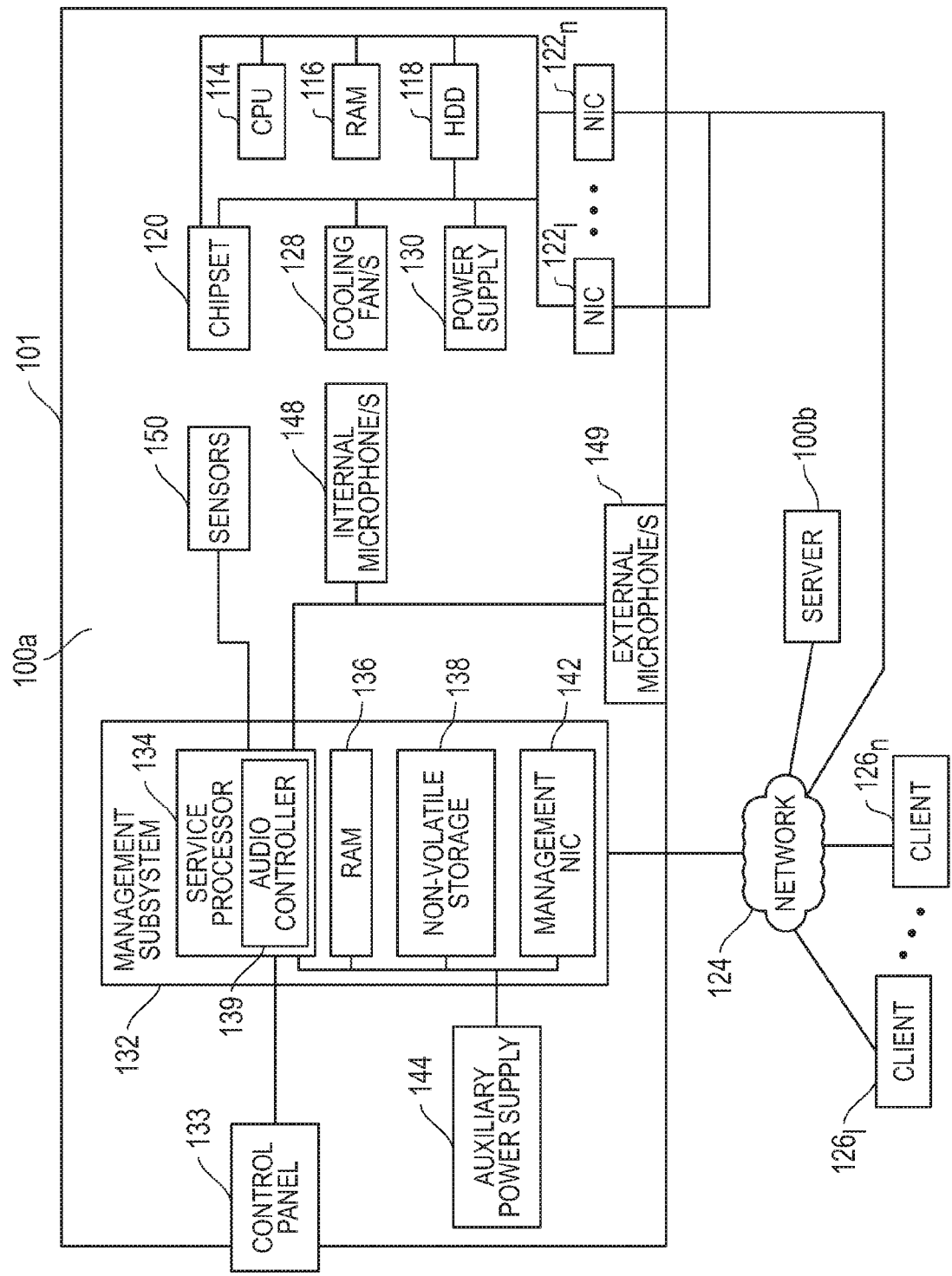
FIG. 1 is a simplified block diagram of information handling system according one exemplary embodiment of the disclosed systems and methods.

FIG. 1 is a block diagram illustrating one exemplary embodiment of an information handling system configured in the form of a server 100a having a plurality of information processing components disposed in a housing 101 including a CPU 114, RAM 116, a hard disk drive (HDD) 118, a chipset 120 and plural network interface cards (NIC) 122. In one embodiment, CPU 114 and other components of server 100a may be configured to perform one or more information processing and/or network routing tasks, e.g., for client information handling systems communicatively coupled to server 100a by network 124. It will be understood that the disclosed systems and methods may be implemented with a variety of other types of information handling systems besides servers, e.g., desktop computers, notebook computers, etc.

As illustrated, in this embodiment server 100a communicates over a network 124 with client information handling systems 126 and other servers 100, such as in a local area network (LAN) configuration. One or more cooling fan/s 128 remove excess heat produced by the processing components and a power supply 130 maintains DC power to the processing components. A management subsystem 132 configured as a remote access card is integrated with server information handling system 100a. Management subsystem 132 includes an embedded service management processor 134 (e.g., such as a BMC microcontroller or any other suitable type of processing device), RAM 136, non-volatile storage (NVS) 138 (e.g., Electrically Erasable Programmable Read Only Memory—EEPROM, NOR ROM, NAND FLASH, Hard disk, etc.), and a NIC 142 to interface with network 24. Service processor 134 may be configured with audio controller logic 139 which will be described further herein. In the illustrated embodiment, management subsystem 132 may operate on an optional auxiliary power supply 144 to run independently of the rest of information handling system 100a. Independent operation of management subsystem 132 allows it to reset, power down and power up information handling system 100a. In one exemplary embodiment, management subsystem 132 may manage the operations of information handling system 100a so that a remote user interfaced through network 124 can exercise full control over system operations.

In one embodiment, remote control, reproduction and display of server operating parameters (e.g., such as internally generated sound parameters) may be accomplished using out of band methods such as Web graphical user interface (GUI) using an integrated Dell Remote Access Controller (iDRAC) available from Dell Products L.P. of Round Rock, Tex. and/or textually via Intelligent Platform Management Interface (IPMI), Dell Remote Access Controller (RACADM) or WS Management (WS-MAN). Further information on remote access controllers may be found in United States Patent Application Publication Number 2006/0212143 and United States Patent Application Publication Number 2006/0190532, each of which is incorporated herein by reference in its entirety. However, it will be understood that other configuration of remote access controllers may be suitably employed in other embodiments.

As further shown in FIG. 1, information handling system may also include one or more internal microphones 148, one or more external (e.g., integral outwardly facing or otherwise externally configured) microphones 149, local control panel 133, and/or one or more sensors 150 (e.g., vibration sensors, internal or external temperature sensors, switch operation sensors, etc.) that may be provided to sense one or more operational parameters (e.g., server power on/off, activation of server switches or buttons, internal operating temperature, etc.) of server 100a and/or one or more environmental parameters around server 100a (e.g., external temperature around housing 101, vibration from external sources, etc.). In this exemplary embodiment, management subsystem 132 may be coupled as shown to control operation of microphones 148 and 149, local control panel 133, and/or one or more sensors 150. Management subsystem 132 may also remain operational on auxiliary power even if server information handling system 100a is inoperative due to a virus infection, an operating system crash, an application failure, hardware failure, etc. Examples of management subsystem features may be found described in United States Patent Application Publication 2006/0265656, which is incorporated herein by reference in its entirety.

Figure 2:
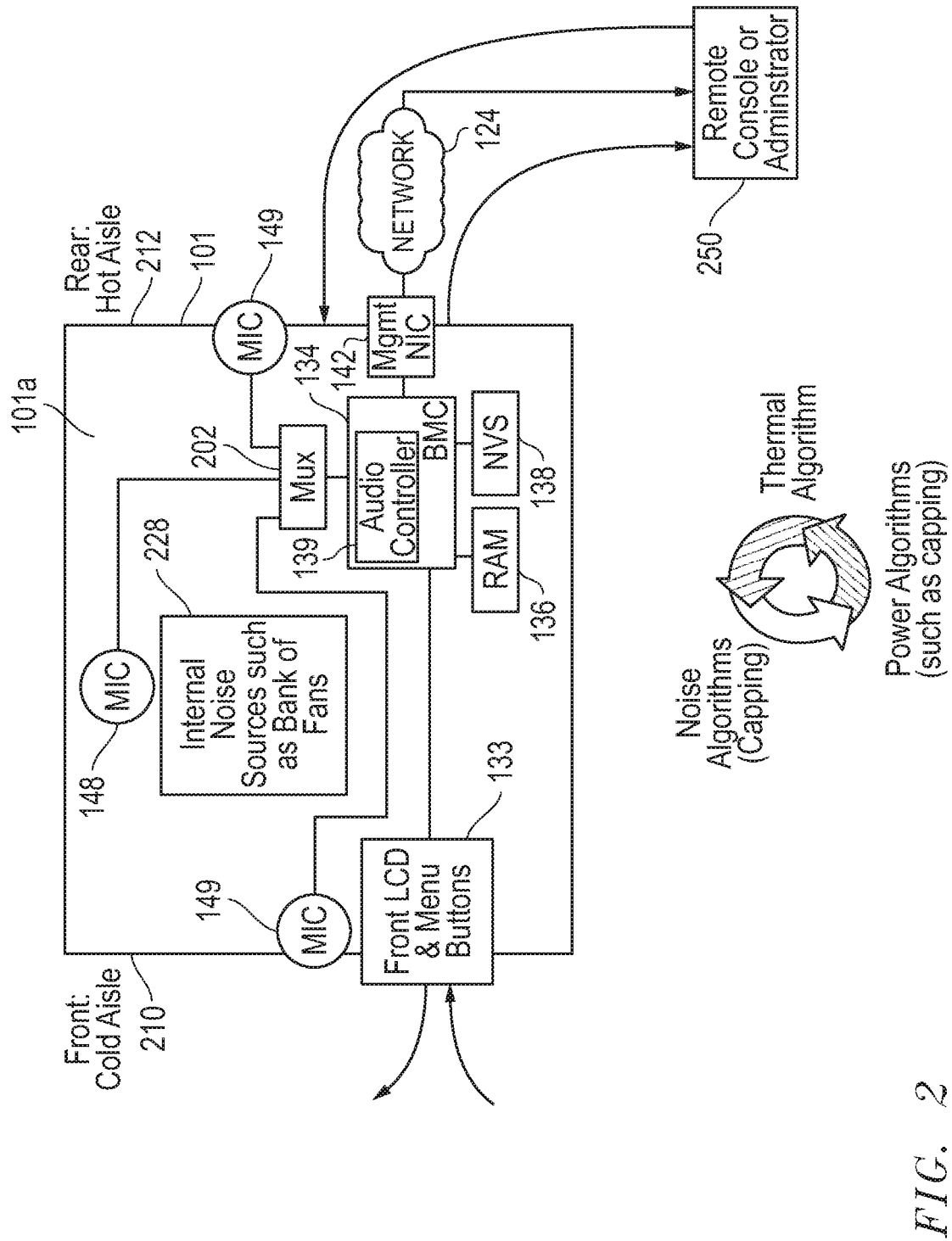
FIG. 2 is a simplified functional block diagram of an information handling system according to one exemplary embodiment of the disclosed systems and methods.

FIG. 2 illustrates a functional block diagram of information handling system 100a configured as a rack server configured to allow for local and remote user control of server generated sound, as well as audio recording (e.g., for sound-producing event logging with sound capture), audio monitoring, and/or analysis of sounds. Among other things, the disclosed systems and methods may be implemented in one embodiment to allow administrators or other personnel to locally and/or remotely monitor the internal and/or external sound levels of multiple servers and to view trends of these sound levels over time.

As shown in FIG. 2, two external microphones 149 and one internal microphone 148 for monitoring sounds are provided in this embodiment. In this case, the external microphones 149 are placed on each of the front (cold aisle) external surface 210 of server housing 101 and the rear (hot aisle) external surface 212 of server housing 101 to monitor external sounds on each side of server housing 101. An internal microphone 148 is positioned adjacent an internal noise source 228 (e.g., such as cooling fan, bank of cooling fans, optical or magnetic disk drive, etc.). Microphones 148 and 149 may be selectively placed and sampled, e.g., as a status and feedback method into a control algorithm executing by audio controller logic 139 and/or otherwise by BMC 134. It will be understood that the positioning and number of microphones 148 and/or 149 may vary in other embodiments.

Local display and control panel 133 may also be provided on the front (cold aisle) surface 210 of housing 101 that in this embodiment includes an LCD display device for selectively observing noise parameters (e.g., such as sounds in dB) and/or other operational and/or programming and status conditions of audio controller logic 139 and/or information handling system 100a. For example, each server of a server rack may be provided with a local external display device (e.g., LCD display with option menu or any other suitable type of display device) that displays instantaneous and/or historical sound levels generated by the server, e.g., in a manner that allows personnel to glance at a rack of servers to determine which of the servers is the loudest. Local display device and control panel 133 may also include menu buttons (or other suitable form of local input device/s) for interfacing with BMC 134 (including audio controller logic 139) and controlling operations of server 100a. Examples of operations that may be controlled include, but are not limited to, recording, storing and sharing of maintenance sound bites gathered from microphones 148 and 149.

Besides controlling sound monitoring and recording operations performed by audio controller logic 139, menu buttons of local display and control panel 133 may also be employed to allow local control of server produced noise by BMC 134, e.g., such as to reduce noise when a technician is performing work on the server. In such a case, a variable reduced-noise timeout may be set such that the reduced server noise mode is terminated after a predetermined amount of reduced noise mode time (e.g., such as one hour or other suitable time). It will be understood that in other embodiments a local control panel 133 may include additional and/or other configurations of I/O features. In one embodiment, BMC 134 may temporarily reduce server noise in response to a user command.

To implement noise control in one embodiment, BMC 134 may use the audio controller 139 to measure and retrieve the sound level of server-generated noise. Then in response to this measured sound level BMC 134 may control system operational parameters to effectively reduce the level of the server-generated noise. In either case, BMC 134 may control the level of server-generated noise by, for example, force throttling of CPU(s), memory components or I/O components, or by reducing bus speeds or by using other methods which reduce power draw, heat creation, hard disk drive rotational speeds, etc. BMC 134 may also temporarily turn off redundant fans such that one becomes standby (off) until the reduced sound mode time expires or a separate fan failure occurs, or by controlling operation of server components in any other manner that results in reduced generated noise.

In the embodiment of FIG. 2, service processor 134 is provided as a baseboard management controller (BMC) that is configured to execute audio controller logic 139 that performs the sound monitoring and control functions described elsewhere herein. Audio controller logic 139 may interface with RAM 136 and/or NVS 138 for local storage and retrieval of code and data related to its functions. It will be understood that service processor 134, RAM 136, NVS 138, and management NIC 142 may be provided as part of a management subsystem 132 such as illustrated in FIG. 1, or in any other suitable configuration. Moreover, local data storage may be implemented within an information handling system chassis using any number and/or combination of memory devices (e.g., RAM, ROM, EEPROM, Flash, optical or magnetic disk drive/s, etc.) suitable for storing sound recordings such as sound bites. As further shown in FIG. 2, mux 202 is coupled to multiplex separate signals from microphones 148 and 149, and provide them to service processor 134 as shown.

Still referring to FIG. 2, service processor 134 is coupled to communicate with remote administrator 250 that may be implemented, for example, as a remote console communicating with audio controller logic 139 of service processor 134 via network 124 and NIC 142. In this configuration, sound monitoring and recording operations performed by audio controller logic 139 may be remotely controlled (e.g., including recording, storing and sharing of maintenance sound bites gathered from microphones 148 and 149), as well as sound level produced by components of server 100a (e.g. so as to reduce noise when a technician is performing work on the server). Selection of a particular microphone/s and/or zone from which to capture sound may also optionally be remotely controlled. Moreover, remote changes to noise policy may be implemented, e.g., such as setting or removing sound targets on particular or recurring dates or times. Service processor 134 may also provide stored and real time information to remote administrator 250 including, but not limited to, current and historic noise profile of server 100a, time-stamped chassis events (e.g., time-stamped log/s or remote alerts provided to administrators of physical chassis events such as chassis intrusion or power supply removal) with an associated and corresponding sound bite captured at and around the time of the event occurrence, live (real time) monitored audio stream/s from microphones 148/149, etc. Configurable monitoring interval and/or duration snapshots may be generated and displayed, for example, to indicate sound intensity (e.g., in decibels), dominant sound frequency (e.g., within the human audible range between 20 Hz to 20 KHz), etc.

Event-related sound bites may be recorded from microphones 148 and 149 in any manner suitable for storage and later local replay or remote transmittal. In one exemplary embodiment, a sound bite recording may be automatically triggered by audio controller 139 upon detection of the occurrence of a pre-specified type of sound event (e.g., occurrence of loud noises over a given sound dB limit, occurrence of specific types of noises such as glass breaking, etc.), or detection of the occurrence of specific types of physical chassis events (e.g., such as changes in presence of component inventory including hard disk drive removal, button presses or cable removal, component health, etc.). Component inventory presence or absence may be detected, for example, by discrete sensors or in any other suitable manner. Identification of specific types of occurring noises may be made, for example, by algorithms that are configured to identify particular sound patterns or waveforms (e.g., waveform matching) and/or frequency of sounds correlating to specific types of noises made by alarm systems, human voices, HVAC units, server components when thermal limits are exceeded, etc.

A sound bite recording may be stored, for example, in a circular buffer that stores a window of recorded time around the time of the event occurrence (e.g., a preselected number of seconds before the event occurrence and a preselected number of seconds after the occurrence of the event). Each sound bite may be stored for later retrieval with a time stamp that identifies when the event occurrence was detected. A sound bite may be retrieved locally (e.g., via a local speaker, head phone jack, or data port) or remotely, and/or may be automatically forwarded to a remote administrator (e.g., attached to an outgoing event alert message). It will be understood that event alerting may be configured remotely or locally via display and control panel 133, e.g., noise thresholds may be set for triggering an event alert and/or type of noise that triggers an event alert may selected. It will also be understood that an event alert may be sent to a remote administrator without a sound bite, e.g., but rather with just textual description of the category of event that occurred (e.g., server chassis intrusion, etc.).

EXAMPLES

The following examples are non-limiting and illustrative of possible embodiments for local and remote recording, control, monitoring and analysis of sounds generated in an information handling system environment, e.g., such as in a rack-mounted server environment.

Example 1

Sound Policy Monitoring and Control

Figure 3:
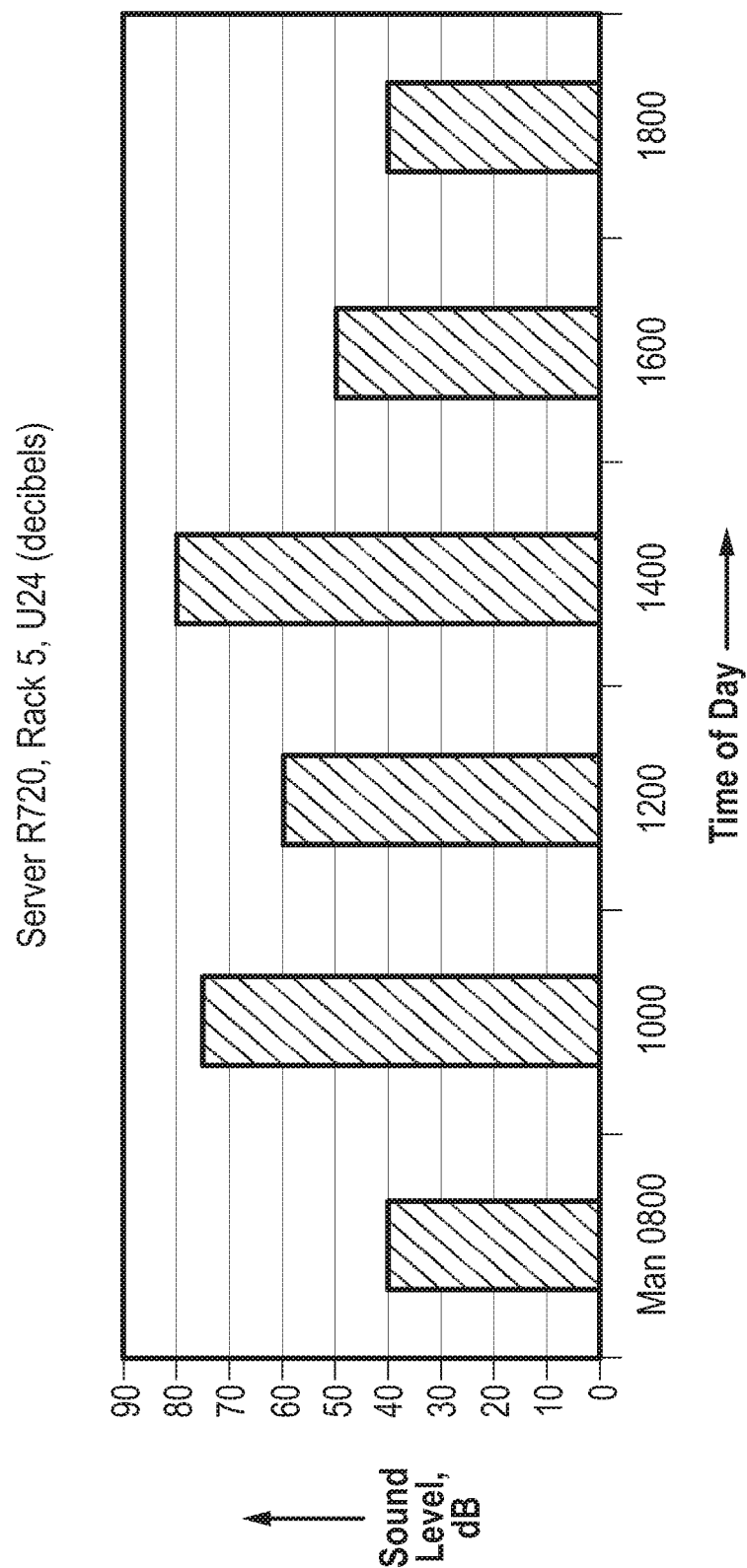
FIG. 3 illustrates an example remote Web GUI according to one exemplary embodiment of the disclosed systems and methods.

A remote user interface may be provided via remote virtual LCD display and remote control, and/or a local user interface may be provided via a server front LCD display and control panel with user menu selections (remote or local display may include real time internal loudness measurement, real time internal temperature, on/off power status, service tag information, user defined functions, etc.). In one embodiment, any one or more of the following display and control options may be provided:
  I. "Current Internal Noise=Y dB" obtained from microphone/s 148 may be displayed by audio controller 139 to remote or local user (where "Y" represents the current measured internal sound level). FIG. 3 illustrates an example remote Web GUI internal noise graph of measured sound level decibels versus time of day of measured sound level. Besides sound level, other non-audio sound characteristic information (i.e., information other than the audible aural sound waves themselves) that may be optionally remotely or locally reported and/or displayed include, but are not limited to, historical peak sound level during a given time period, average sound level over a given time period, sound level as a function of time of day, duration of sound level events or given sound levels, frequency of sound, etc.
  II. "Maximum Internal Sound Target" may be selected by remote or local user from menu selections of "Minimize", "30 dB", "50 dB", "75 dB", "100 dB", or "OFF". In response to user selection, any existing normal performance settings (e.g., thermal and/or power consumption policies) may be overridden and server components (e.g., such as fan/s, drive/s, etc.) may be controlled by audio controller 139 to reduce internal server sound (e.g., such as by reducing fan speed RPM, number of cooling fans currently operating, etc.). For example, pre-determined fan speeds may be correlated to given sound levels to be selected by a user.
  III. "Server Sound Control Period" may be selected locally (e.g., via LCD or chassis control buttons) or remotely (e.g., via Webg GUI, RACADM or WSMAN selectable menu options) from displayed "Timeout" menu selections of "5 minutes", "15 minutes", "1 hour", "1 day", or "Indefinitely". In response to such local or remote user selection, server components (e.g., such as fan/s, drive/s, etc.) may be controlled by audio controller 139 to reduce internal server sound for only the period of time selected by the user, after which the server operational level is returned to normal.
      A. A sound control policy may be so implemented as a noise capping algorithm—The noise capping algorithm may work in conjunction with an existing thermal algorithm (e.g., that reduces server temperature by reducing information processing performance when temperature rises due to decreased cooling fan speed specified by the noise capping algorithm) and existing power capping algorithm (e.g., that reduces server power consumption by limiting maximum server power consumption). The noise capping algorithm may temporarily override power/performance algorithms (e.g., that otherwise specifies minimum server performance level)

Example 2

Event Driven Monitoring, Recording and Alerting

Sound alerts, recording and/or monitoring may be automatically triggered by audio controller 139 upon detection of certain pre-specified events by audio controller 139. In one embodiment, any one or more of the following monitoring, alerting and/or recording options may be provided:
  Configurable Event Trigger—Types of triggering sound events or physically chassis events may be pre-specified by remote or local user and measured by one or more external microphones 149 (although sound events detected by internal microphone/s 148 may alternatively or additionally employed)

A. External noises above sound level threshold of X decibels (where "X" represents a pre-selected sound level threshold)
B. Specific types of external noises (voices, glass breaking, burglar, fire or smoke alarms, increased data center fan noise reflecting external temperature or data center workload, etc.)
C. Specific server physical chassis events (chassis intrusion, chassis inventory changes, button presses, fan failure, disk drive failure, etc.)

II. Sound Monitoring Event Monitoring, Alert and Reporting Actions—Types of sound monitoring/recording and any subsequent alerts and reporting may be pre-specified by remote and/or local user
  A. Live streaming—local sounds from microphones 148 and/or 149 may be streamed continuously to remote user (e.g., administrator) upon occurrence of a pre-specified event.
  B. Sound recordings—sound from microphones 148 and/or 149 may be recorded upon occurrence of a pre-specified event and locally stored, e.g., in RAM 136 or Flash memory 138 of management subsystem 132. Sound storage per sample may have a configurable duration (e.g., maximum of approximately 10 minutes per sample).
  C. Alert and Reporting Options
    1. Sounds may be locally stored for later remote or local retrieval (e.g., from RAM 136 or Flash memory 138 of management subsystem 132).
    2. Sound alerts (e.g., SNMP or email message) alone may be sent to remote user upon occurrence of a pre-specified event.
    3. Sound alerts (e.g., SNMP or email message) with included recorded sound bite (MP3) may be sent to remote user upon occurrence of a pre-specified event.

III. Configurable Sound Buffer Trigger Position—Length and positioning of recorded sound relative to event occurrence may be variable and selected by remote or local user (e.g., as % of buffer space stored before and after event occurrence). Examples are as follows
  A. 0% before/100% after—only start recording and storing monitored sound from microphones 148 and/or 149 after event occurrence is detected.
  B. 50% before/50% after—always record monitored sounds from microphones 148 and/or 149. Upon event trigger, store monitored sound until specified or available buffer is full
  C. 100% before/0% after—stop recording upon occurrence of event. Stored buffer Example 3

Local Recording

Local users may be provided with the ability to record sound bites for later local and/or remote retrieval (e.g., such as a message related to maintenance, a sound bite recording of data center or individual operation sounds currently occurring, etc.). Microphone/s 148 and/or 149 may be used for this purpose, and audio controller 139 may control recording and local storage of sound bites, e.g., in RAM 136 or Flash memory 138 of management subsystem 132.
  I. Sound Bite Recording Control and Display Menu Example—A sound bite log control and display menu may be provided with a control option (e.g., button, GUI option, etc.) to record a time-stamped sound bite message.
    A. Example locally displayed recording menu option: "Press select to start recording message. Release when message is complete for time stamping"
    B. After message is recorded, it may be locally stored, time-stamped and menu-listed (or index/catalogued) by audio controller 139 for later selection and retrieval by a local or remote user.
  II. Example Sound Bite Message: "Technician Ted replaced PSU2 on January 2nd at 4:30. Also, hard disk #3 was not fully seated. Call me if you want it fixed"

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

It will be understood that one or more of the tasks, functions, or methodologies described herein (e.g., including those performed by audio controller 139 and service management processor 134) may be implemented, for example, as firmware or other computer program of instructions embodied in a non-transitory tangible computer readable medium that is executed by a CPU, controller, microcontroller, processor, microprocessor, FPGA, ASIC, or other suitable processing device.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:
1. An information handling system, comprising:
  a chassis;
  one or more processing devices disposed within the chassis and configured to process information;
  at least one noise source within the chassis;
  at least one microphone positioned to capture sound produced by the noise source within the chassis; and
  one or more processing devices disposed within the chassis and configured to determine and provide non-audio sound characteristic information of the noise source based on sound signals received from the microphone;

where the one or more processing devices are configured to implement a sound control policy to vary the sound level produced by the noise source based at least in part on the level of sound captured by the microphone; and
where the one or more processing devices are configured to reduce the sound level produced by the noise source by controlling operational performance of the noise source.

2. The information handling system of claim 1, where the one or more processing devices are configured to communicate with a remote user over a network; and where the one or more processing devices are configured to provide the non-audio sound characteristic information to the remote user over the network.

3. The information handling system of claim 1, further comprising an external local display device coupled to the chassis; and where the one or more processing devices are configured to provide the non-audio sound characteristic information for display on the external local display device.

4. The information handling system of claim 1, where a where the noise source is a cooling fan; and where the one or more processing devices are configured to implement the sound control policy in combination with a thermal control policy that reduces information processing operational performance in response to increased temperature due to reduced operational performance of the cooling fan.

5. The information handling system of claim 1, where the one or more processing devices are configured to reduce the current sound level produced by the noise source to a minimized sound level or to a specific lower sound level value specified by a remote or local user command.

6. The information handling system of claim 1, where the one or more processing devices are configured to reduce the current sound level produced by the noise source to a new lower sound level for a selected interval of time before allowing the sound level produced by the noise source to increase to a previous higher sound level.

7. The information handling system of claim 1, where the non-audio sound characteristic information comprises information other than audible aural sound waves.

8. The information handling system of claim 1, where the non-audio sound characteristic information comprises at least one of current measured sound level, historical peak sound level during a given time period, sound level as a function of time of day, duration of sound level events or given sound levels, frequency of sound, or a combination thereof.

9. An information handling system, comprising:
a chassis;
one or more processing devices disposed within the chassis and configured to process information;
at least one internal or external microphone positioned to capture sound produced inside or outside the chassis; and
one or more processing devices disposed within the chassis and configured to detect occurrence of a specific type of internal or external sound-producing event from sound signals provided by an internal or external microphone, and at least one of the following:
where the one or more processing devices are configured to take one or more actions upon detection of the occurrence of the specific type of internal or external sound event, the one or more actions comprising: live streaming of sound captured by the microphone across a network to a remote user; storing in local storage coupled to the audio controller a recorded sound bite of the detected particular type of sound-producing event with a time stamp for later local or remote retrieval, transmittal of an outgoing event alert message across a network to a remote user, attachment of a recorded sound bite of the detected particular type of sound-producing event with an outgoing event alert across a network to a remote user, storing for later retrieval a recorded sound bite of the detected particular type of sound-producing event in a circular buffer that stores a window of recorded time around the time of the occurrence of the sound-producing event, or a combination thereof, or
where the type of sound-producing event is configurable by a user based on a sound level threshold, a detected noise type, or a combination thereof, or
a combination thereof.

10. The information handling system of claim 9, where the one or more processing devices disposed within the chassis are configured to detect occurrence of a particular type of external sound-producing event from sound signals provided by an external microphone, and to take one or more actions upon detection of the occurrence of the particular type of external sound event, the one or more actions comprising live streaming of sound captured by the external microphone across a network to a remote user; storing in local storage coupled to the audio controller a recorded sound bite of the detected particular type of external sound-producing event with a time stamp for later local or remote retrieval, transmittal of an outgoing event alert message across a network to a remote user, attachment of a recorded sound bite of the detected particular type of external sound-producing event with an outgoing event alert across a network to a remote user, or a combination thereof.

11. The information handling system of claim 9, where the one or more processing devices disposed within the chassis are configured to detect occurrence of a particular type of external sound-producing event from sound signals provided by an external microphone, and further comprising a circular buffer coupled to the audio controller; and where the one or more processing devices are configured to store for later retrieval a recorded sound bite of the detected particular type of external sound-producing event in a circular buffer that stores a window of recorded time around the time of the occurrence of the external sound-producing event.

12. The information handling system of claim 9, where the one or more processing devices disposed within the chassis are configured to detect occurrence of a particular type of external sound-producing event from sound signals provided by an external microphone, and where the type of external sound-producing event is configurable by a user based on a sound level threshold, a detected noise type, or a combination thereof.

13. An information handling system, comprising:
a chassis;
one or more processing devices disposed within the chassis and configured to process information; and
at least one internal or external microphone positioned to capture sound produced inside or outside the chassis;
where the one or more processing devices disposed within the chassis are configured to detect occurrence of a physical chassis event, and to capture sounds produced inside or outside the chassis during the physical chassis event upon detection of the occurrence of the physical chassis event for later remote retrieval across a network by a remote user.

14. An information handling system, comprising:
a chassis;
at least one microphone positioned to monitor sounds outside the chassis;
local data storage;

one or more processing devices disposed within the chassis and configured to process information; and one or more processing devices disposed within the chassis and configured to receive sound signals from the microphone and to store the sound signals as sound data on the local data storage, the one or more processing devices being further configured to store in local storage coupled to the audio controller a recorded sound bite from the microphone in response to a local user command, the recorded sound bite comprising a voice message from the user for later remote retrieval across a network by a remote user.

15. A method of operating an information handling system, comprising:

processing information using one or more processing devices disposed within a chassis of an information handling system;

capturing sound produced by at least one noise source disposed within the chassis of the information handling system;

using one or more processing devices disposed within the information handling system to determine and provide non-audio sound characteristic information of the noise source based on the captured sound produced by the noise source;

implementing a sound control policy to vary the sound level produced by the noise source based at least in part on the level of the captured sound; and reducing the sound level produced by the noise source by controlling operational performance of the noise source.

16. The method of claim 15, further comprising providing the non-audio sound characteristic information from the information handling system to a remote user over a network.

17. The method of claim 15, further comprising providing the non-audio sound characteristic information from inside the information handling system chassis for display on an external local display device.

18. The method of claim 15, where the noise source is a cooling fan; and where the method further comprises implementing the sound control policy in combination with a thermal control policy that reduces information processing operational performance in response to increased temperature due to reduced operational performance of the cooling fan.

19. The method of claim 15, further comprising reducing the current sound level produced by the noise source to a minimized sound level or to a specific lower sound level value specified by a remote or local user command.

20. The method of claim 15, further comprising reducing the current sound level produced by the noise source to a new lower sound level for a selected interval of time before allowing the sound level produced by the noise source to increase to a previous higher sound level.

21. The method of claim 15, where the non-audio sound characteristic information comprises information other than audible aural sound waves.

22. The method of claim 15, where the non-audio sound characteristic information comprises at least one of current measured sound level, historical peak sound level during a given time period, sound level as a function of time of day, duration of sound level events or given sound levels, frequency of sound, or a combination thereof.

23. A method of operating an information handling system, comprising:

processing information using one or more processing devices disposed within a chassis of an information handling system;

capturing sound produced inside or outside the chassis of the information handling system; and using one or more processing devices disposed within the information handling system to detect occurrence of a particular type of an internal or external sound-producing event from a captured sound produced inside or outside the chassis of the information handling system, and at least one of the following:

using one or more processing devices disposed within the information handling system to take one or more actions upon detection of the occurrence of the particular type of internal or external sound event, er the one or more actions comprising: live streaming of the captured sound across a network from the information handling system to a remote user; locally storing a recorded sound bite of the detected particular type of sound-producing event with a time stamp for later local or remote retrieval, transmittal of an outgoing event alert message across a network from the information handling system to a remote user, attachment of a recorded sound bite of the detected particular type of sound-producing event with an outgoing event alert across a network from the information handling system to a remote user, storing for later retrieval a recorded sound bite of the detected particular type of sound-producing event in a circular buffer that stores a window of recorded time around the time of the occurrence of the detected particular type of sound event, or a combination thereof;

accepting input from a local or remote user to configure the type of particular type of sound-producing event based on a sound level threshold, a detected noise type, or a combination thereof; or a combination thereof.

24. The method of claim 23, comprising using one or more processing devices disposed within the information handling system to detect occurrence of a particular type of external sound-producing event from a captured sound produced outside the chassis of the information handling system, and to take one or more actions upon detection of the occurrence of the particular type of external sound event, the one or more actions comprising live streaming of the captured sound across a network from the information handling system to a remote user; locally storing a recorded sound bite of the detected particular type of external sound-producing event with a time stamp for later local or remote retrieval, transmittal of an outgoing event alert message across a network from the information handling system to a remote user, attachment of a recorded sound bite of the detected particular type of external sound-producing event with an outgoing event alert across a network from the information handling system to a remote user, or a combination thereof.

25. The method of claim 23, further comprising using one or more processing devices disposed within the information handling system to detect occurrence of a particular type of external sound-producing event, and storing for later retrieval a recorded sound bite of the detected particular type of external sound-producing event in a circular buffer that stores a window of recorded time around the time of the occurrence of the detected particular type of external sound event.

26. The method of claim 23, comprising using one or more processing devices disposed within the information handling system to detect occurrence of a particular type of external sound-producing event from a captured sound produced outside the chassis of the information handling system, and to take one or more actions upon detection of the occurrence of the particular type of external sound event; and accepting input from a local or remote user to configure the type of particular type of external sound-producing event based on a sound level threshold, a detected noise type, or a combination thereof.

27. A method of operating an information handling system, comprising:

processing information using one or more processing devices disposed within a chassis of an information handling system;

capturing sound produced inside or outside the chassis of the information handling system; and using one or more processing devices disposed within the information handling system to detect occurrence of a physical chassis event, and to capture sounds produced inside or outside the chassis during the physical chassis event upon detection of the occurrence of the physical chassis event for later remote retrieval across a network by a remote user.

28. A method of operating an information handling system, comprising:

processing information using one or more processing devices disposed within a chassis of an information handling system;

capturing sound produced outside the chassis of the information handling system; and using one or more processing devices disposed within the information handling system to store in local storage coupled to the audio controller a recorded sound bite produced outside the chassis of the information handling system in response to a local user command, the recorded sound bite comprising a voice message from the user for later remote retrieval across a network by a remote user.

\* \* \* \* \*